US010875951B2

(12) United States Patent
Chae et al.

(10) Patent No.: US 10,875,951 B2
(45) Date of Patent: Dec. 29, 2020

(54) PROPYLENE-DIENE COPOLYMER RESIN HAVING EXCELLENT MELT TENSION

(71) Applicant: LOTTE CHEMICAL CORPORATION, Seoul (KR)

(72) Inventors: Byung Hun Chae, Daejeon (KR); Hyun Yul Woo, Daejeon (KR); Rai Ha Lee, Suwon-si (KR); Joon Keun Min, Daejeon (KR); Sung Won Jung, Seoul (KR); Youn Jin Hong, Daejeon (KR); Eun Hye Shin, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 52 days.

(21) Appl. No.: 16/091,658

(22) PCT Filed: Apr. 6, 2017

(86) PCT No.: PCT/KR2017/003788
§ 371 (c)(1),
(2) Date: Oct. 5, 2018

(87) PCT Pub. No.: WO2017/176074
PCT Pub. Date: Oct. 12, 2017

(65) Prior Publication Data
US 2019/0119427 A1    Apr. 25, 2019

(30) Foreign Application Priority Data
Apr. 6, 2016   (KR) .................. 10-2016-0042125

(51) Int. Cl.
| C08F 210/06 | (2006.01) |
| C08F 232/06 | (2006.01) |
| C08F 236/02 | (2006.01) |
| C08F 236/04 | (2006.01) |
| C08F 236/06 | (2006.01) |
| C08F 236/08 | (2006.01) |
| C08F 236/20 | (2006.01) |
| C08F 10/06 | (2006.01) |
| C08F 2/44 | (2006.01) |
| C08F 2/60 | (2006.01) |
| C08F 236/22 | (2006.01) |
| C08F 4/659 | (2006.01) |

(52) U.S. Cl.
CPC .............. *C08F 236/06* (2013.01); *C08F 2/44* (2013.01); *C08F 2/60* (2013.01); *C08F 10/06* (2013.01); *C08F 210/06* (2013.01); *C08F 232/06* (2013.01); *C08F 236/22* (2013.01); *C08F 4/65912* (2013.01); *C08F 2420/01* (2013.01); *C08F 2500/11* (2013.01); *C08F 2500/12* (2013.01); *C08F 2800/10* (2013.01)

(58) Field of Classification Search
CPC .... C08F 236/02; C08F 236/04; C08F 236/06; C08F 236/08; C08F 236/20; C08F 232/06; C08F 210/06
See application file for complete search history.

(56) References Cited

U.S. PATENT DOCUMENTS

| 5,670,595 A | 9/1997 | Meka et al. |
| 6,303,698 B1 | 10/2001 | Ushioda et al. |
| 7,226,886 B2 | 6/2007 | Jayaratne et al. |
| 2014/0194277 A1 | 7/2014 | Ishihama et al. |
| 2015/0119539 A1 | 4/2015 | McCullough |

FOREIGN PATENT DOCUMENTS

| CN | 1194654 A | 9/1998 |
| EP | 0 659 756 A1 | 12/1994 |
| EP | 0 420 436 B1 | 8/1996 |
| EP | 0 416 815 B1 | 8/1997 |
| EP | 0 842 939 B1 | 10/2004 |
| JP | 07-165814 A | 6/1995 |
| JP | 07-224079 A | 8/1995 |
| JP | 08-092317 A | 4/1996 |
| JP | 11-511499 A | 10/1999 |
| JP | 2002-226520 A | 8/2002 |
| JP | 2003-286321 A | 10/2003 |
| JP | 2011-137146 A | 7/2011 |
| KR | 1999-0044019 A | 6/1999 |
| KR | 10-2014-0133343 A | 11/2014 |
| KR | 10-2015-0029368 A | 3/2015 |
| WO | WO 99/11680 A1 | 3/1999 |

OTHER PUBLICATIONS

Machine-generated English-language translation of JP 2002226520A.*
English translation of EP 0 659 756 A1, published Dec. 19, 1994, Hoechst Aktiengesellschaft (25 pgs.).
European Office Action (ESSR) in corresponding European Application No. 17 779 374.2, ESSR dated Nov. 22, 2019 (3 pgs.).
Japan Office Action from corresponding Japan Application No. 2018-552047, Japan Office action dated Aug. 25, 2020 (3 pgs.).

* cited by examiner

*Primary Examiner* — Vu A Nguyen
(74) *Attorney, Agent, or Firm* — Lewis Roca Rothgerber Christie LLP

(57) ABSTRACT

Disclosed is a propylene-diene copolymer resin having excellent melt tension, with improved melt strength, high molecular weight and broad molecular weight distribution by using a specific metallocene catalyst system. The present invention provides a propylene-diene copolymer resin produced by polymerizing propylene and a diene compound of C4-C20 by using a metallocene catalyst system, wherein the propylene-diene copolymer resin has the melt index (2.16 kg load at 230° C.) of 0.1-100 g/10 min and the melt tension (advanced rheometric expansion system (ARES)) of 5-100 g.

5 Claims, No Drawings

PROPYLENE-DIENE COPOLYMER RESIN HAVING EXCELLENT MELT TENSION

CROSS-REFERENCE TO RELATED APPLICATIONS

The present application is a U.S. National Phase Patent Application and claims priority to and the benefit of International Application Number PCT/KR2017/003788, filed on Apr. 6, 2017, which claims priority of Korean Patent Application Number 10-2016-0042125, filed on Apr. 6, 2016, the entire contents of all of which are incorporated herein by reference.

TECHNICAL FIELD

The present invention relates to a propylene-diene copolymer resin, and more particularly, to a propylene-diene copolymer resin having excellent melt tension produced by using a metallocene catalyst system.

BACKGROUND ART

Polypropylene and related polymeric resins are known to have low melt strength. However, these properties are pointed out as weak points in the fields of main applications such as thermoforming and blow molding. The limitation of the melt strength of polypropylene is appeared as excessive settling in sheet extrusion, high-speed thinning of the part walls thermoformed in the melt phase, low draw-down ratio in extruded covering, poor bubble formation in extruded foam materials, and the relative vulnerability in blow molding of large parts. Thus, polypropylene and related polymer resins having commercially valuable processability as well as improved melt strength are constantly demanded commercially.

Studies to increase the melt strength of polymeric resins such as polypropylene have been conducted over the last few decades, but their success has been limited. Representative methods include a method of copolymerizing propylene with an α-ω-diene in order to introduce unsaturated groups into the polymer using conventional Ziegler-Natta type catalysts. However, the processing method generally uses a post-process of polymerized polypropylene to obtain similar products through peroxide decomposition, and thus, the manufacturing cost through the post-process is expensive and the peroxide decomposition process may be harmful to workers and problems such as changes in properties of the resins due to the residual amount of unreacted monomers may be caused. In addition, there was a problem that gelling of the resin itself occurs due to excessively injected diene. Therefore, there is a continuing need for research into propylene polymer resins having improved melt strength and good processability.

An olefin polymerization catalyst system can be classified into Ziegler-Natta and metallocene catalyst systems, and these two high-activity catalyst systems have been developed for each characteristics. Although Ziegler Natta catalyst has been widely applied to commercial processes since its invention in the 1950s, it is characterized by wide molecular weight distribution of the polymer resin because it is a multi-site catalyst in which a plurality of active species are mixed, and there is a problem in that the desired properties cannot be obtained due to non-homogeneous compositional distribution of co-monomers. However, the metallocene catalyst system consists of a combination of a main catalyst, of which the main component is a metallocene compound, and a cocatalyst, which is an organometallic compound mainly composed of aluminum. The catalyst system is a homogeneous system complex catalyst and a single site catalyst and thus, it has characteristics that a polymer having narrow molecular weight distribution and a homogeneous compositional distribution of co-monomers can be obtained according to the single active site characteristic and the stereoregularity, copolymer characteristics, molecular weight, degree of crystallinity and the like of the polymer may be changed depending on the modification of ligand structure of the catalyst and changes in polymerization conditions.

PRIOR PATENT LITERATURE

Korean Laid-Open Patent Publication No. 2015-0029368 (Mar. 18, 2015)
Korean Laid-Open Patent Publication No. 2014-0133343 (Nov. 19, 2014)
U.S. Pat. No. 7,226,886 (Jun. 5, 2007)
European Patent No. 0416815 (Mar. 13, 1991)
European Patent No. 0420436 (Apr. 3, 1991)
European Patent No. 0842939 (May 20, 1998)

DISCLOSURE OF THE INVENTION

Technical Problem

The present invention has been made to solve the above-mentioned problems, and it is an object of the present invention to provide a propylene-diene copolymer resin having excellent melt tension with improved melt strength, high molecular weight and broad molecular weight distribution, produced by using a specific metallocene catalyst system.

Technical Solution

In order to solve the above-mentioned problems, the present invention provides a propylene-diene copolymer resin produced by a method comprising the step of polymerizing propylene and a diene compound of C4-C20 by using a catalyst system, wherein the catalyst system comprises: a metallocene compound represented by the following Chemical Formula 1; and at least one cocatalyst compound selected from the group consisting of a boron compound represented by the following Chemical Formulae 2 to 4 and an aluminum compound represented by the following Chemical Formulae 5 to 9, and the propylene-diene copolymer resin has the melt index (2.16 kg load at 230° C.) of 0.1-100 g/10 min and the melt tension (advanced rheometric expansion system (ARES)) of 5-100 g:

[Chemical Formula 1]

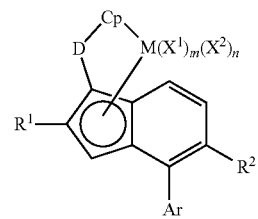

$B(R^{11})_3$      [Chemical Formula 2]

$[R^{12}]^+[B(R^{11})_4]^-$      [Chemical Formula 3]

$[(R^{13})_rZH]^+[B(R^{11})_4]^-$      [Chemical Formula 4]

$-[Al(R^{14})-O]_s-$      [Chemical Formula 5]

$(R^{14})_2Al-[O(R^{14})]_t-(R^{14})_2$      [Chemical Formula 6]

$(R^{15})_uAl(E)_{3-u}$      [Chemical Formula 7]

$(R^{16})_2AlOR^{17}$      [Chemical Formula 8]

$R^{16}Al(OR^{17})_2$      [Chemical Formula 9]

in Chemical Formula 1, M is a transition metal, and m is 2 and n is 0 when M is a tetravalent transition metal of group 4 of the periodic table, and m is 0 and n is 1 when M is a divalent transition metal of group 4 of the periodic table; Cp is a cyclopentadienyl ring which may be $\eta^5$-bonded to M and the cyclopentadienyl ring may be further substituted by at least one selected from the group consisting of (C1-C20) alkyl, (C3-C20) cycloalkyl, (C6-C20) aryl, tri(C1-C20) alkylsilyl, tri(C6-C20) arylsilyl, (C1-C20) alkyldi (C6-C20) arylsilyl, (C6-C20) aryldi (C1-C20) alkylsilyl and (C2-C20) alkenyl; D is $SiR^3R^4$ or (C2-C20) alkenylene; $R^3$ and $R^4$ are each independently hydrogen, (C1-C20) alkyl, (C3-C20) cycloalkyl or (C6-C20) aryl, or $R^3$ and $R^4$ may be linked by (C4-C7) alkylene to form a ring; $R^1$ is (C1-C20) alkyl; Ar is (C6-C20) aryl; $R^2$ is hydrogen, (C1-C20) alkyl, (C3-C20) cycloalkyl or (C6-C20) aryl; the Ar and $R^2$ may be linked by (C1-C7) alkylene, (C2-C7) alkenylene or (C4-C7) alkane dienylene to form a fused ring; $X^1$ is halogen, (C1-C20) alkyl, (C1-C20) alkoxy, (C3-C20) cycloalkyl, (C6-C20) aryl, (C6-C20) aryloxy, $-OSiR^aR^bR^c$, $-SR^d$, $-NR^eR^f$, or $-PR^gR^h$; $R^a$ to $R^h$ are each independently (C1-C20) alkyl, (C6-C20) aryl or (C3-C20) cycloalkyl; $X^2$ is a neutral, conjugated or nonconjugated (C4-C20) diene; the alkyl in $R^1$, the aryl in Ar, the alkyl, cycloalkyl, and aryl in $R^2$, $R^3$, and $R^4$ may be each independently further substituted by at least one substituent selected from the group consisting of halogen, (C1-C20) alkyl, halo (C1-C20) alkyl, (C3-C20) cycloalkyl, (C6-C20) aryl, (C1-C20) alkoxy and (C6-C20) aryloxy;

in Chemical Formulae 2 to 4, B is a boron atom; $R^{11}$ is phenyl, and the phenyl may be further substituted by three to five substituents selected from a fluorine atom, (C1-C20) alkyl, (C1-C20) alkyl substituted by a fluorine atom, (C1-C20) alkoxy, and (C1-C20) alkoxy substituted by a fluorine atom; $R^{12}$ is a (C5-C7) aromatic radical or a (C1-C20) alkyl (C6-C20) aryl radical or a (C6-C20) aryl (C1-C20) alkyl radical; Z is a nitrogen or phosphorus atom; $R^{13}$ is a (C1-C20) alkyl radical or an anilinium radical substituted by two (C1-C10) alkyls together with a nitrogen atom; r is an integer of 2 or 3;

in Chemical Formulae 5 to 9, R14 is (C1-C20) alkyl; s and t are each independently an integer of 5 to 20; $R^{15}$ and $R^{16}$ are each independently (C1-C20) alkyl; E is a hydrogen atom, a halogen atom or (C1-C20) alkyl; u is an integer of 1 to 3; $R^{17}$ is (C1-C20) alkyl or (C6-C20) aryl.

In addition, the present invention provides the propylene-diene copolymer resin, wherein in the step of polymerizing, the content of the diene compound is prepared in 0.001 to 3 mol % based on the propylene.

In addition, the present invention provides the propylene-diene copolymer resin, wherein the diene compound is at least one selected from the group consisting of linear or branched C4-C20 diene or C5-C20 cyclodiene.

The present invention also provides the propylene-diene copolymer resin, wherein the diene compound is at least one selected from the group consisting of 1,3-butadiene, 1,4-pentadiene, 2-methyl-1,3-butadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimentyl-1,5-hexadiene, cyclopentadiene, cyclohexadiene, cycloheptadiene, and cyclooctadiene.

Furthermore, the present invention provides the propylene-diene copolymer resin, wherein the propylene-diene copolymer resin has the gel content of 10% by weight or less.

Advantageous Effects

The present invention provides a diene-modified propylene-diene copolymer resin in a polymerization process by using a specific metallocene catalyst system and thus the present invention can provide a propylene-diene copolymer resin having improved melt strength, high molecular weight and broad molecular weight distribution compared to conventional homopolymer resins.

In addition, the present invention can provide a propylene-diene copolymer resin having excellent properties with low process cost compared to long-chain branched resins produced by conventional post-processes.

MODE FOR CARRYING OUT THE INVENTION

Hereinafter, preferred embodiments of the present invention will be described in detail. In describing the present invention, when it is considered that specific explanation about the related known techniques may make the main points of the present invention unclear, the detailed description thereof is omitted. Throughout the specification, when the phrase '"comprising" an element' is used, it means that unless specifically stated otherwise, it does not exclude other elements, rather it can further include other elements.

Polypropylene resins are widely used in various resin products because of their high softening temperature, tensile strength, flexural rigidity, stiffness, and the like, and high transparency and surface gloss of shaped articles. However, due to the rapid melting phenomenon at the softening temperature, it has been difficult to carry out foaming, thermoforming, extrusion, coating, blow forming, and the like. Therefore, the present inventors have repeated studies to overcome the difficulties and as a result, we provided a diene-modified propylene-diene copolymer resin in a polymerization process by using a specific metallocene catalyst system and thus found that it is possible to provide a propylene-diene copolymer resin having improved melt strength, high molecular weight and broad molecular weight distribution compared to conventional homopolymer resins, thereby leading to the present invention.

Accordingly, the present invention provides a propylene-diene copolymer resin produced by polymerizing propylene and a diene compound of C4-C20 by using the following metallocene catalyst system, wherein the propylene-diene copolymer resin has the melt index (2.16 kg load at 230° C.) of 0.1-100 g/10 min and the melt tension (advanced rheometric expansion system (ARES)) of 5-100 g.

The propylene-diene copolymer resin according to the present invention is produced by a method comprising the step of polymerizing propylene and a diene compound of C4-C20 in the presence of a catalyst system comprising: a metallocene compound represented by the following Chemical Formula 1; and at least one cocatalyst compound selected from the group consisting of a boron compound represented by the following Chemical Formulae 2 to 4 and an aluminum compound represented by the following Chemical Formulae 5 to 9.

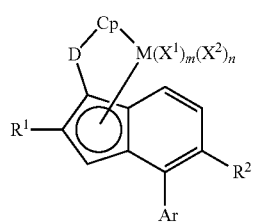

[Chemical Formula 1]

In Chemical Formula 1, M is a transition metal, and m is 2 and n is 0 when M is a tetravalent transition metal of group 4 of the periodic table, and m is 0 and n is 1 when M is a divalent transition metal of group 4 of the periodic table; Cp is a cyclopentadienyl ring which may be $\eta^5$-bonded to M and the cyclopentadienyl ring may be further substituted by at least one selected from the group consisting of (C1-C20) alkyl, (C3-C20) cycloalkyl, (C6-C20) aryl, tri(C1-C20) alkylsilyl, tri(C6-C20) arylsilyl, (C1-C20) alkyldi (C6-C20) arylsilyl, (C6-C20) aryldi (C1-C20) alkylsilyl and (C2-C20) alkenyl; D is $SiR^3R^4$ or (C2-C20) alkenylene; $R^3$ and $R^4$ are each independently hydrogen, (C1-C20) alkyl, (C3-C20) cycloalkyl or (C6-C20) aryl, or $R^3$ and $R^4$ may be linked by (C4-C7) alkylene to form a ring; $R^1$ is (C1-C20) alkyl; Ar is (C6-C20) aryl; $R^2$ is hydrogen, (C1-C20) alkyl, (C3-C20) cycloalkyl or (C6-C20) aryl; the Ar and $R^2$ may be linked by (C1-C7) alkylene, (C2-C7) alkenylene or (C4-C7) alkane dienylene to form a fused ring; $X^1$ is halogen, (C1-C20) alkyl, (C1-C20) alkoxy, (C3-C20) cycloalkyl, (C6-C20) aryl, (C6-C20) aryloxy, $-OSiR^aR^bR^c$, $-SR^d$, $-NR^eR^f$, or $-PR^gR^h$; $R^a$ to $R^h$ are each independently (C1-C20) alkyl, (C6-C20) aryl or (C3-C20) cycloalkyl; $X^2$ is a neutral, conjugated or nonconjugated (C4-C20) diene; the alkyl in $R^1$, the aryl in Ar, the alkyl, cycloalkyl, and aryl in $R^2$, $R^3$, and $R^4$ may be each independently further substituted by at least one substituent selected from the group consisting of halogen, (C1-C20) alkyl, halo (C1-C20) alkyl, (C3-C20) cycloalkyl, (C6-C20) aryl, (C1-C20) alkoxy and (C6-C20) aryloxy.

$B(R^{11})_3$ [Chemical Formula 2]

$[R^{12}]^+[B(R^{11})_4]^-$ [Chemical Formula 3]

$[(R^{13})_rZH]^+[B(R^{11})_4]^-$ [Chemical Formula 4]

In Chemical Formulae 2 to 4, B is a boron atom; $R^{11}$ is phenyl, and the phenyl may be further substituted by three to five substituents selected from a fluorine atom, (C1-C20) alkyl, (C1-C20) alkyl substituted by a fluorine atom, (C1-C20) alkoxy, and (C1-C20) alkoxy substituted by a fluorine atom; $R^{12}$ is a (C5-C7) aromatic radical or a (C1-C20) alkyl (C6-C20) aryl radical or a (C6-C20) aryl (C1-C20) alkyl radical; Z is a nitrogen or phosphorus atom; $R^{13}$ is a (C1-C20) alkyl radical or an anilinium radical substituted by two (C1-C10) alkyls together with a nitrogen atom; r is an integer of 2 or 3.

$-[Al(R^{14})-O]_s-$ [Chemical Formula 5]

$(R^{14})_2Al-[O(R^{14})]_t-(R^{14})_2$ [Chemical Formula 6]

$(R15)_uAl(E)3-u$ [Chemical Formula 7]

$(R^{16})_2AlOR^{17}$ [Chemical Formula 8]

$R^{16}Al(OR^{17})_2$ [Chemical Formula 9]

In Chemical Formulae 5 to 9, $R^{14}$ is (C1-C20) alkyl; s and t are each independently an integer of 5 to 20; $R^{15}$ and $R^{16}$ are each independently (C1-C20) alkyl; E is a hydrogen atom, a halogen atom or (C1-C20) alkyl; u is an integer of 1 to 3; $R^{17}$ is (C1-C20) alkyl or (C6-C20) aryl.

As set forth in the present invention, the term "alkyl" means a monovalent straight or branched saturated hydrocarbon radical, consisting solely of carbon and hydrogen atoms. Examples of such alkyl radicals include, but are not limited to, methyl, ethyl, propyl, isopropyl, butyl, isobutyl, t-butyl, pentyl, hexyl, octyl, dodecyl, and the like.

In addition, as set forth in the present invention, the term "cycloalkyl" means a monovalent alicyclic alkyl radical, consisting of one ring. Examples of cycloalkyl include, but are not limited to, cyclopropyl, cyclobutyl, cyclopentyl, cyclohexyl, cycloheptyl, cyclooctyl, cyclononyl, cyclodecyl, and the like.

In addition, as set forth in the present invention, the term "alkenyl" means a straight or branched hydrocarbon radical containing at least one carbon-carbon double bond, and includes, but is not limited to, ethenyl, propenyl, butenyl, pentenyl and the like.

In addition, as set forth in the present invention, the term "aryl" means an organic radical derived from an aromatic hydrocarbon by removal of one hydrogen and includes a single or fused ring system. Specific examples include, but are not limited to, phenyl, naphthyl, biphenyl, anthryl, fluorenyl, phenanthryl, triphenylenyl, pyrenyl, perylenyl, chrysenyl, naphthacenyl, fluoranthenyl and the like.

In addition, as set forth in the present invention, the term "alkoxy" means an —O-alkyl radical, where 'alkyl' is as defined above. Examples of such alkoxy radicals include, but are not limited to, methoxy, ethoxy, isopropoxy, butoxy, isobutoxy, t-butoxy, and the like.

In addition, as set forth in the present invention, the term "aryloxy" means an —O-aryl radical, where 'aryl' is as defined above. Examples of such aryloxy radicals include, but are not limited to, phenoxy, biphenoxy, naphthoxy, and the like.

In addition, as set forth in the present invention, the term "halogen" means a fluorine, chlorine, bromine or iodine atom.

In the present invention, the metallocene compound, as represented by Chemical Formula 1, has an ansa-metallocene structure comprising a cyclopentadiene derivative ligand and an indenyl derivative ligand, in which aryl is necessarily substituted at the 4-position, which are connected to each other by a bridge group of silicon or alkenylene.

As such, the metallocene compound has the indene derivative ligand substituted with aryl at the 4-position, thereby having excellent catalytic activity and copolymeric property compared to a metallocene compound having a ligand unsubstituted with aryl at the 4-position of the indene, and thus allows the production of the propylene-diene copolymer resin having high melt strength, high molecular weight, and uniform compositional distribution.

In one embodiment of the present invention, the metallocene compound of Chemical Formula 1 may be preferably represented by the following Chemical Formulae 10 or 11.

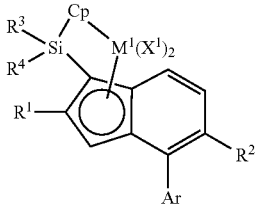

[Chemical Formula 10]

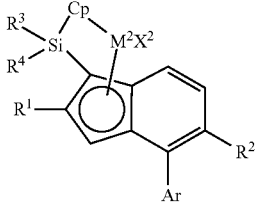

[Chemical Formula 11]

In the Chemical Formulae 10 and 11, $M^1$ is a tetravalent transition metal of group 4, $M^2$ is a divalent transition metal of group 4, and Cp, Ar, $R^1$ to $R^4$, $X^1$ and $X^2$ are as defined in Chemical Formula 1.

In one embodiment of the present invention, when M is tetravalent titanium, zirconium or hafnium, m is 2 and n is 0, and when M is divalent titanium, zirconium or hafnium, m is 0 and n is 1; Cp is a cyclopentadienyl ring is (C1-C20) alkyl is substituted or unsubstituted; $R^1$ is (C1-C20) alkyl, (C6-C20) aryl (C1-C20) alkyl, or halo (C1-C20) alkyl; Ar is (C6-C20) aryl; $R^2$ is hydrogen or (C6-C20) aryl; Ar and $R^2$ may be linked by (C1-C7) alkylene, (C2-C7) alkenylene, or (C4-C7) alkane dienylene to form a fused ring, the aryl in Ar and $R^2$ may be further substituted with at least one substituent selected from the group consisting of halogen, (C1-C20) alkyl, halo (C1-C20) alkyl, (C3-C20) cycloalkyl, (C6-C20) aryl, (C1-C20) alkoxy, and (C6-C20) aryloxy; $R^3$ and $R^4$ are (C1-C20) alkyl, (C6-C20) aryl (C1-C20) alkyl, halo (C1-C20) alkyl, (C6-C20) aryl, or (C1-C20) alkyl (C6-C20) aryl, and $R^3$ and $R^4$ may be linked by (C4-C7) alkylene to form a ring; $X^1$ is halogen, (C1-C20) alkyl, (C1-C20) alkoxy, or di(C1-C20) alkylamino; and $X^2$ may be a neutral conjugated 1,3-(C4-C20) diene.

In one embodiment of the present invention, in Chemical Formulae 10 and 11, $M^1$ is tetravalent titanium, zirconium or hafnium; $M^2$ is divalent titanium, zirconium or hafnium; Cp is a cyclopentadienyl ring in which (C1-C20) alkyl is substituted or unsubstituted; $R^1$ is (C1-C20) alkyl, (C6-C20) aryl (C1-C20) alkyl, or halo (C1-C20) alkyl; Ar is (C6-C20) aryl; $R^2$ is hydrogen or (C6-C20) aryl; Ar and $R^2$ may be linked by (C1-C7) alkylene, (C2-C7) alkenylene, or (C4-C7) alkane dienylene to form a fused ring, the aryl in Ar and $R^2$ may be further substituted with at least one substituent selected from the group consisting of halogen, (C1-C20) alkyl, halo (C1-C20) alkyl, (C3-C20) cycloalkyl, (C6-C20) aryl, (C1-C20) alkoxy, and (C6-C20) aryloxy; $R^3$ and $R^4$ are (C1-C20) alkyl, (C6-C20) aryl (C1-C20) alkyl, halo (C1-C20) alkyl, (C6-C20) aryl, or (C1-C20) alkyl (C6-C20) aryl, and $R^3$ and $R^4$ may be linked by (C4-C7) alkylene to form a ring; $X^1$ is halogen, (C1-C20) alkyl, (C1-C20) alkoxy, or di(C1-C20) alkylamino; and $X^2$ may be a neutral conjugated 1,3-(C4-C20) diene.

In one embodiment of the present invention, the Cp is cyclopentadienyl, methylcyclopentadienyl, dimethylcyclopentadienyl, trimethylcyclopentadienyl, tetramethylcyclopentadienyl, or butylcyclopentadienyl; $R^1$ is methyl, ethyl, propyl, butyl, pentyl, hexyl, benzyl, or trifluoromethyl; Ar is phenyl, naphthyl, biphenyl, or anthryl; $R^2$ is hydrogen, phenyl, naphthyl, biphenyl, or anthryl; the phenyl, naphthyl, biphenyl, or anthryl, in Ar and $R^2$, may be further substituted with at least one substituent selected from the group consisting of fluoro, chloro, iodo, bromo, methyl, ethyl, propyl, butyl, pentyl, hexyl, trifluoromethyl, cyclopropyl, cyclopentyl, cyclohexyl, phenyl, naphthyl, methoxy, ethoxy, propoxy, butoxy, pentyloxy, hexyloxy, and phenoxy; Ar and $R^2$ may be linked by methylene, ethenylene, or 1,3-butane dienylene to form a fused ring; $R^3$ and $R^4$ are methyl, ethyl, propyl, butyl, pentyl, hexyl, benzyl, trifluoromethyl, phenyl, naphthyl, biphenyl, anthryl, or tolyl, and $R^3$ and $R^4$ may be linked by a butylene or pentylene to form a ring; $X^1$ is fluoro, chloro, iodo, bromo, methyl, ethyl, propyl, butyl, pentyl, hexyl, methoxy, ethoxy, propoxy, butoxy, pentyloxy, hexyloxy, dimethylamino, diethylamino, dipropylamino, dibutylamino, butylpropylamino, dihexylamino, dioctylamino, or methylethylamino; $X^2$ may be 1,3-butadiene, 1,3-pentadiene, 1,3-hexadiene, 1,3-heptadiene or 1,3-octadiene.

In one embodiment of the present invention, the metallocene compound may be selected from compounds having the following structures, but is not limited thereto:

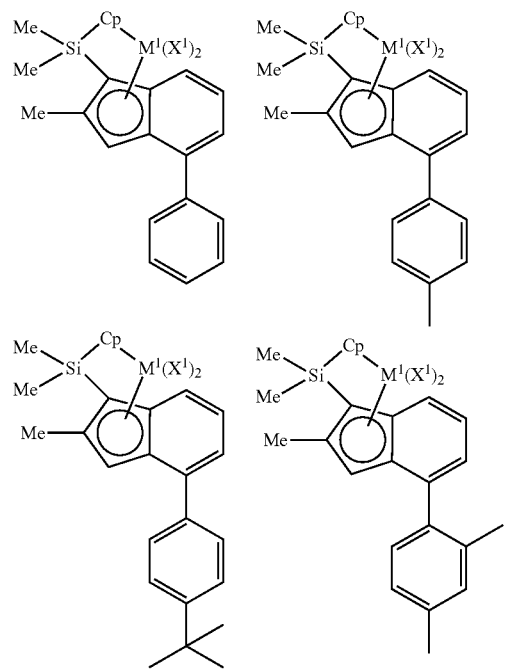

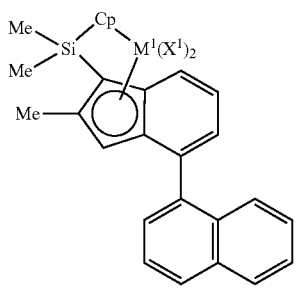
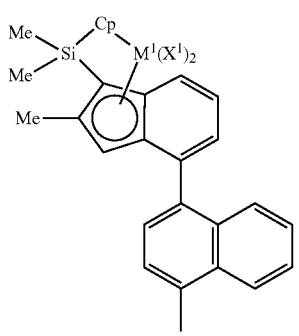
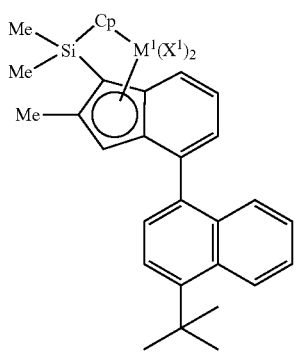
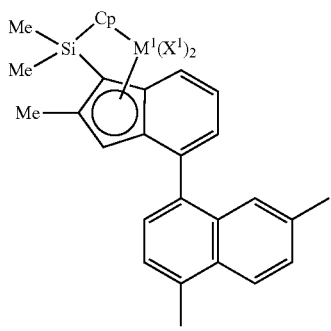
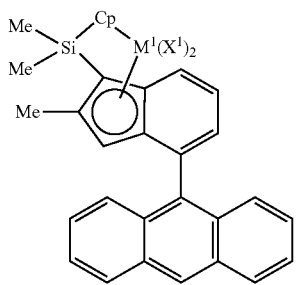
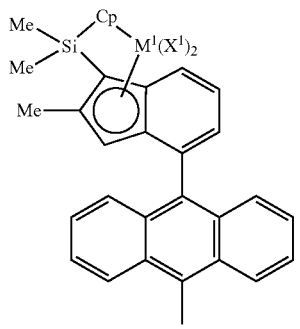
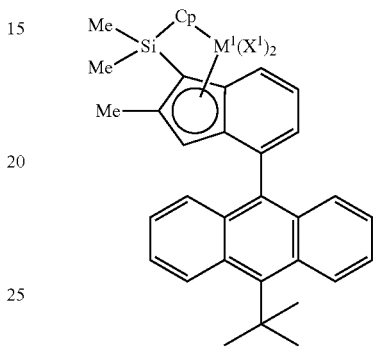
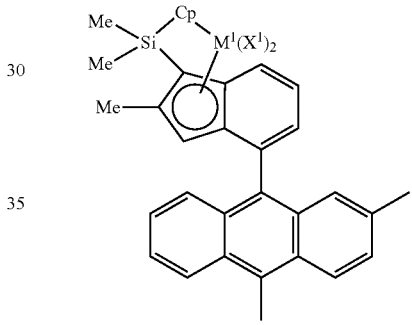
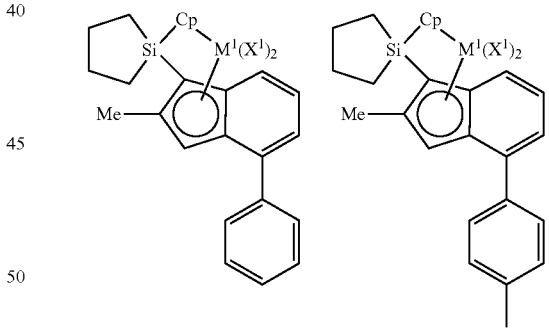
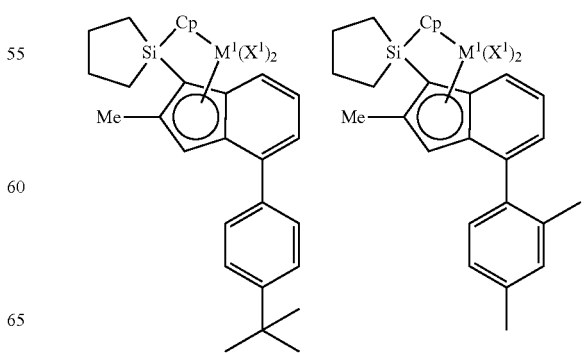

-continued
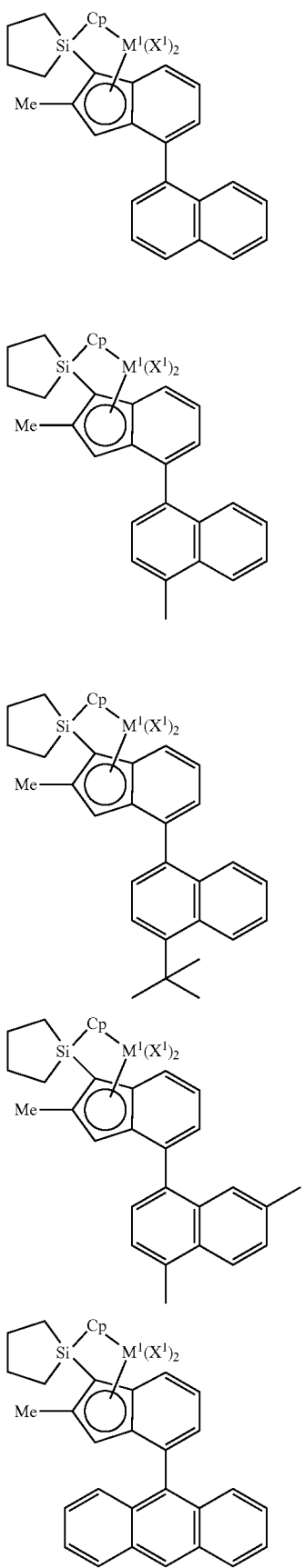
-continued
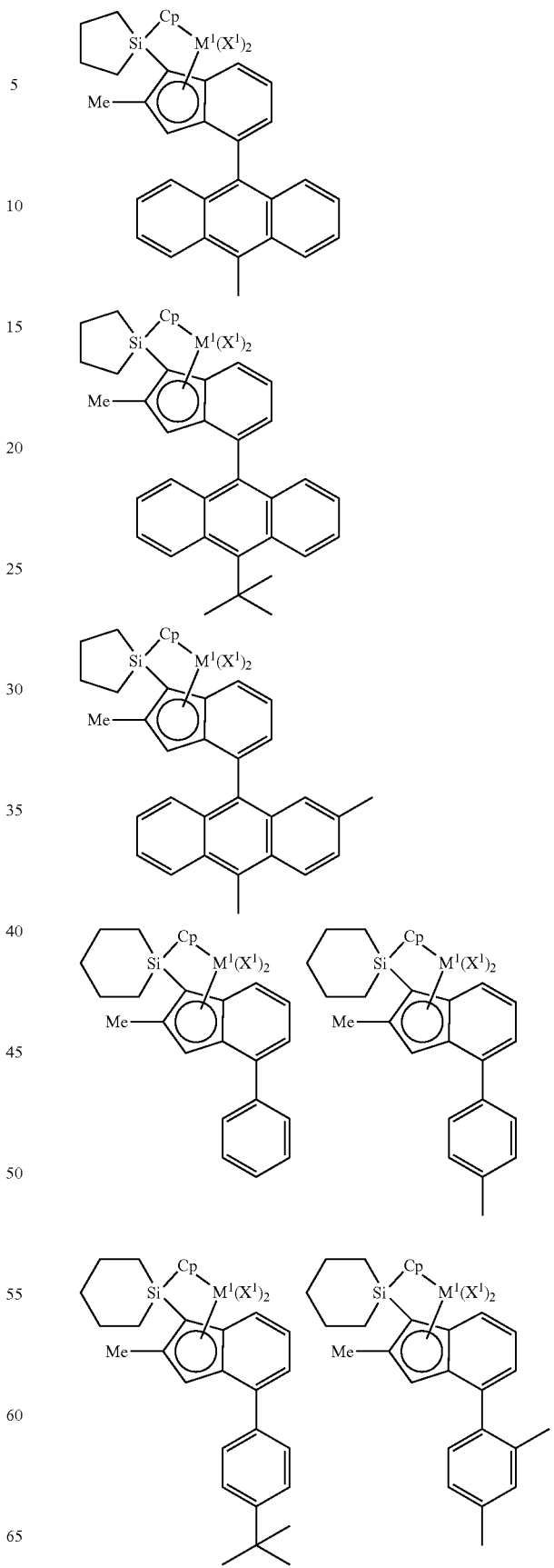

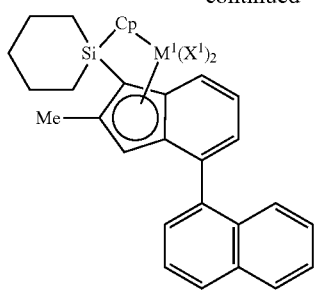
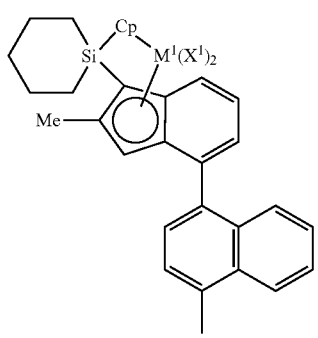
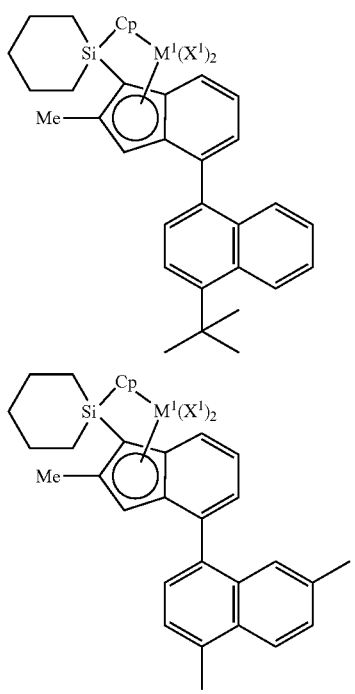
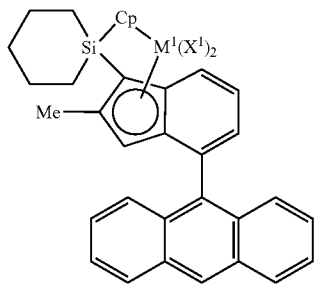
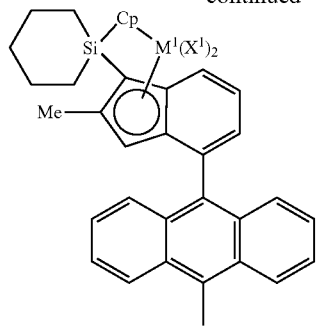
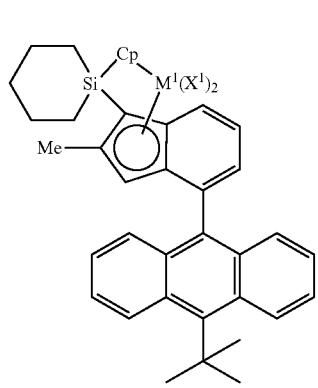
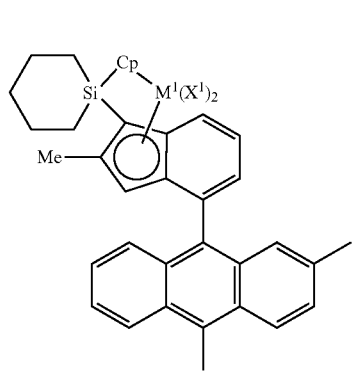
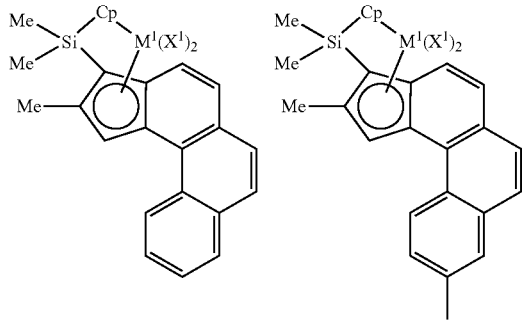
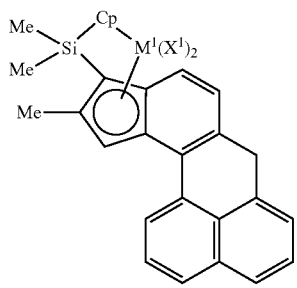

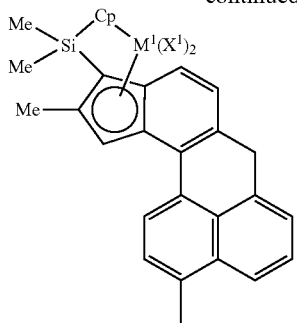
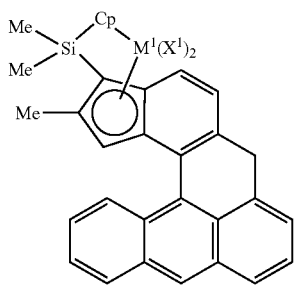
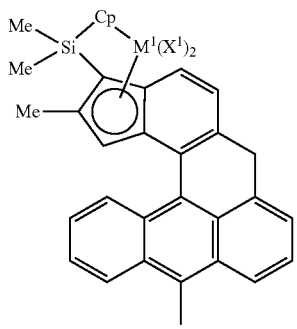
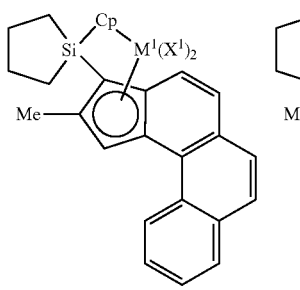
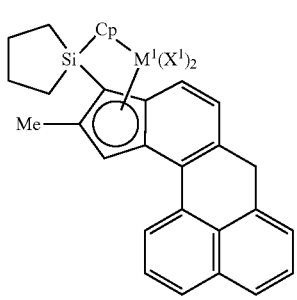
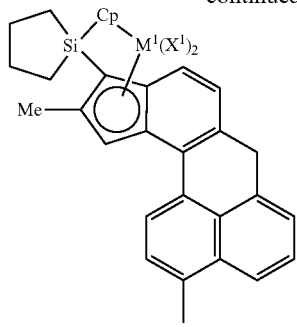
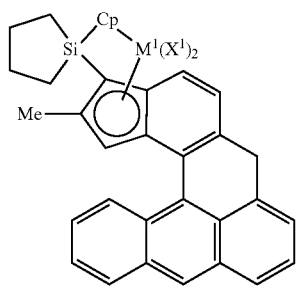
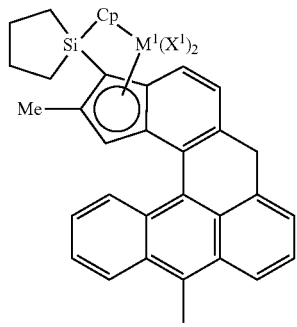
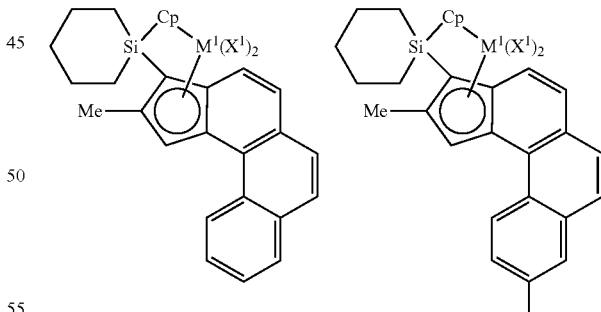
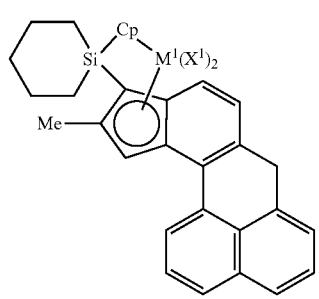

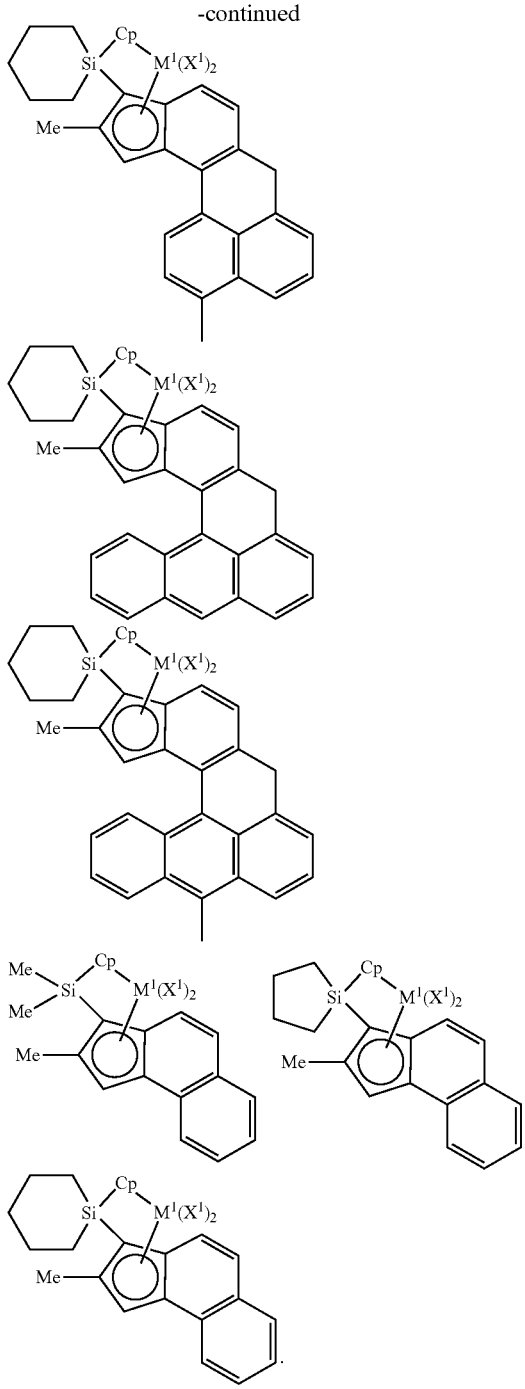

In the above structure, Cp is cyclopentadienyl, methylcyclopentadienyl, dimethylcyclopentadienyl, diisopropylcyclopentadienyl, trimethylcyclopentadienyl, or tetramethylcyclopentadienyl; $M^1$ is tetravalent titanium, zirconium or hafnium; and $X^1$ is chloro, fluoro, bromo, methyl, ethyl, propyl, butyl, pentyl, methoxy, ethoxy, propoxy, butoxy, or dimethylamino.

Meanwhile, in order for the metallocene compound in Chemical Formula 1 to be an active catalyst component for use in the polypropylene polymerization, the ligand in the metallocene compound is extracted to cationize the central metal and the metallocene compound acts together with the cocatalyst compound which are an aluminum compound or a boron compound or a mixture thereof which can be act as a counter ion, i.e., anion with weak binding force.

The boron compound used as the cocatalyst compound in the present invention may be boron compounds disclosed in the U.S. Pat. No. 5,198,401, and specifically is selected from the compounds represented by the following Chemical formulae 2 to 4.

$$B(R^{11})_3 \qquad \text{[Chemical Formula 2]}$$

$$[R^{12}]^+[B(R^{11})_4]^- \qquad \text{[Chemical Formula 3]}$$

$$[(R^{13})_rZH]^+[B(R^{11})_4]^- \qquad \text{[Chemical Formula 4]}$$

In Chemical Formulae 2 to 4, B is a boron atom; $R^{11}$ is phenyl, and the phenyl may be further substituted by three to five substituents selected from a fluorine atom, (C1-C20) alkyl, (C1-C20) alkyl substituted by a fluorine atom, (C1-C20) alkoxy, and (C1-C20) alkoxy substituted by a fluorine atom; $R^{12}$ is a (C5-C7) aromatic radical or a (C1-C20) alkyl (C6-C20) aryl or a (C6-C20) aryl (C1-C20) alkyl radical; Z is a nitrogen or phosphorus atom; $R^{13}$ is a (C1-C20) alkyl radical or an anilinium radical substituted by two (C1-C10) alkyls together with a nitrogen atom; r is an integer of 2 or 3.

Preferable examples of the boron-based cocatalyst compound include tris (pentafluorophenyl) borane, tris (2,3,5,6-tetrafluorophenyl) borane, tris (2,3,4,5-tetrafluorophenyl) borane, tris (3,4,5-trifluorophenyl) borane, tris (2,3,4-trifluorophenyl) borane, phenyl bis (pentafluorophenyl) borane, triphenyl methylium tetrakis (pentafluorophenyl) borate, triphenyl methylium tetrakis (2,3,5,6-tetrafluorophenyl) borate, triphenyl methylium tetrakis (2,3,4,5-tetrafluorophenyl) borate, triphenyl methylium tetrakis (3,4,5-trifluorophenyl) borate, triphenyl methylium tetrakis (2,2,4-trifluorophenyl) borate, triphenyl methylium phenyl bis (pentafluorophenyl) borate, or triphenyl methylium tetrakis (3,5-bistrifluoromethylphenyl) borate. Specific combination examples of these compounds include ferrocenium tetrakis (pentafluorophenyl) borate, 1,1'-dimethylferrocenium tetrakis (pentafluorophenyl) borate, tetrakis (pentafluorophenyl) borate, triphenyl methylium tetrakis (pentafluorophenyl) borate, triphenyl methylium tetrakis (3,5-bistrifluoromethylphenyl) borate, triethylammonium tetrakis (pentafluorophenyl) borate, tripropylammonium tetrakis (pentafluorophenyl) borate, tri(n-butyl)ammonium tetrakis (pentafluorophenyl) borate, tri(n-butyl)ammonium tetrakis (3,5-bistrifluorophenyl) borate, N,N-dimethylanilinium tetrakis (pentafluorophenyl) borate, N,N-diethylanilinium tetrakis (pentafluorophenyl) borate, N,N-2,4,6-pentamethylanilinium tetrakis (pentafluorophenyl) borate, N,N-dimethylanilinium tetrakis (3,5-bistrifluoromethylphenyl) borate, diisopropylammonium tetrakis (pentafluorophenyl) borate, dicyclohexylammonium tetrakis (pentafluorophenyl) borate, triphenylphosphonium tetrakis (pentafluorophenyl) borate, tri(methylphenyl)phosphonium tetrakis (pentafluorophenyl) borate, or tri(dimethylphenyl)phosphonium tetrakis (pentafluorophenyl) borate. The most preferred among them are N,N-dimethylanilinium tetrakis (pentafluorophenyl) borate, triphenyl methylnium tetrakis (pentafluorophenyl) borate, or tris (pentafluoro) borane.

In addition, the aluminum compound used as the cocatalyst compound is the aluminoxane compound of Chemical Formulas 5 or 6, the organoaluminum compound of Chemical Formula 7, or the organoaluminum alkyloxide or organoaluminum aryloxide compound of Chemical Formulas 8 or 9.

$$—[Al(R^{14})—O]_s—$$ [Chemical Formula 5]

$$(R^{14})_2Al—[O(R^{14})]_t—(R^{14})_2$$ [Chemical Formula 6]

$$(R^{15})_uAl(E)_{3-u}$$ [Chemical Formula 7]

$$(R^{16})_2AlOR^{17}$$ [Chemical Formula 8]

$$R^{16}Al(OR^{17})_2$$ [Chemical Formula 9]

In Chemical Formulae 5 to 9, $R^{14}$ is (C1-C20) alkyl; s and t are each independently an integer of 5 to 20; $R^{15}$ and $R^{16}$ are each independently (C1-C20) alkyl; E is a hydrogen atom, a halogen atom or (C1-C20) alkyl; u is an integer of 1 to 3; $R^{17}$ is (C1-C20) alkyl or (C6-C20) aryl.

Specific examples of the aluminum compound that can be used include aluminoxane compounds, such as methylaluminoxane, modified methylaluminoxane, and tetraisobutylaluminoxane, and organoaluminum compounds, such as trialkylaluminum, including trimethylaluminum, triethylaluminum, tripropylaluminum, triisobutylaluminum, trihexylaluminum and trioctylaluminum; dialkyl aluminum chlorides, including dimethyl aluminum chloride, diethyl aluminum chloride, dipropyl aluminum chloride, diisobutyl aluminum chloride, and dihexyl aluminum chloride; alkylaluminum dichlorides, including methylaluminum dichloride, ethylaluminum dichloride, propylaluminum dichloride, isobutylaluminum dichloride, and hexylaluminum dichloride; and dialkylaluminum hydrides, including dimethyl aluminum hydride, diethyl aluminum hydride, dipropyl aluminum hydride, diisobutyl aluminum hydride and dihexyl aluminum hydride. Preferably, the aluminum compound that can be used are aluminoxane compounds, trialkylaluminum or mixtures thereof and more preferably, they are methyl aluminoxane, modified methyl aluminoxane, triethylaluminum, triisobutyl aluminum or mixtures thereof.

In the catalyst system according to the present invention, when the aluminum compound, particularly the aluminoxane compound, is used as the cocatalyst compound, the ratio of the transition metal (M) in Chemical Formula 1 to the aluminum atom (Al) is based on the molar ratio of 1:10 to 1:5,000, more preferably 1:100 to 1:2,000. In addition, in the catalyst system according to the present invention, as for the preferable range of the ratio between the metallocene compound of Chemical Formula 1 and the cocatalyst compounds, the ratio of the central metal (M):the boron atom (B):and the aluminum atom (Al) is based on the molar ratio of 1:0.1 to 200:10 to 1,000, more preferably 1:1 to 20:10 to 500. The propylene-diene copolymer resin can be produced with the above-mentioned ratio and the range of the ratio varies depending on the purity of the reaction.

Since the metallocene compound and the cocatalyst compounds are present in a homogeneous form in the polymerization reactor, the catalyst system presented in the present invention is preferably applied to a solution polymerization process carried out at a temperature above the melting point of the polymer resin. However, as disclosed in U.S. Pat. No. 4,752,597, the catalyst system may be used for a slurry polymerization or gas phase polymerization process in the form of a non-homogeneous catalyst composition obtained by supporting the metallocene compound and the cocatalyst compounds on a porous metal oxide support. Therefore, when used together with an inorganic carrier or an organic polymer carrier, the catalyst system of the present invention can be applied also to a slurry or gas phase process. That is, the metallocene compound and the cocatalyst compounds may also be used in the form supported on the inorganic carrier or the organic polymer carrier.

The propylene-diene copolymer resin according to the present invention is prepared by polymerizing propylene and a C4-C20 diene compound in the presence of the catalyst system. Herein, the metallocene compound and the cocatalyst compounds may be separately introduced into the reactor, or the respective components may be premixed and introduced into the reactor. There is no particular limitation on the mixing conditions such as the order of introduction, temperature or concentration.

The diene compound may be selected from linear or branched C4-C20 diene or C5-C20 cyclodiene, and for example, it may be 1,3-butadiene, 1,4-pentadiene, 2-methyl-1,3-butadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, cyclopentadiene, cyclohexadiene, cycloheptadiene and cyclooctadiene, alone, or a mixture of two or more thereof.

At this time, the content of the diene compound to be polymerized in the production of the propylene-diene copolymer resin may be 0.001 to 3 mol %, preferably 0.01 to 1 mol %. If the content is out of the above range, the catalytic activity may be deteriorated or the thermal characteristics may be undesirable in terms of the melt strength.

The polymerization may be carried out in a slurry, liquid or gas phase, and when the polymerization is carried out in a liquid or slurry phase, a solvent or a monomer itself may be used as a medium.

Preferred organic solvents that may be used in the polymerization are C3-C20 hydrocarbons. Specific examples thereof include butane, isobutane, pentane, hexane, heptane, octane, isooctane, nonane, decane, dodecane, cyclohexane, methylcyclohexane, benzene, toluene, xylene, and the like.

The polymerization may be carried out in a batch, semi-continuous or continuous reaction, and may be carried out at the temperature of from 25 to 300° C., preferably from 50 to 250° C., and the pressure of from 1 to 100 bars, preferably from 5 to 50 bars. The temperature and pressure conditions of the polymerization step may be determined in consideration of the efficiency of the polymerization reaction depending on the kind of the reaction to be applied and the kind of a reactor.

The propylene-diene copolymer resin according to the present invention has the melt index (230° C., 2.16 kg load) of 0.1 to 100 g/10 min and the melt tension (advanced rheometric expansion system (ARES)) as measured by the following method of 5 to 100 g, and preferably, it may have the melt index of 0.5 to 30 g/10 min and the melt tension of 10 to 50 g, more preferably the melt index of 0.5 to 10 g/10 min and the melt tension of 10 to 45 g, and even more preferably the melt index of 1 to 5 g/10 min and the melt tension of 20 to 40 g. Here, the propylene-diene copolymer resin according to the present invention can realize an improved melt strength by the use of the catalyst system, and can reduce the gel content compared to homopolymer resins prepared by using the conventional Ziegler-Natta catalyst system. The gel content may be 10 wt % or less, preferably 8 wt % or less, more preferably 7 wt % or less, and even more preferably 5 wt % or less.

In addition, the propylene-diene copolymer resin according to the present invention has two melting peaks in the range from 140° C. to 135° C., and has the weight average molecular weight of 100,000 to 500,000 and the molecular weight distribution (Mw/Mn) of 4 to 20, and preferably, it may have two melting peaks in the range of 140 to 154° C. and the range of 129 to 135° C., the weight average molecular weight of 300,000 to 500,000 and the molecular weight distribution (Mw/Mn) of 5 to 10, more preferably two melting peaks in the range of 140 to 151° C. and in the range of 132 to 135° C. and the weight average molecular weight of 350,000 to 450,000 and the molecular weight distribution (Mw/Mn) of 6 to 10.

There is no limitation in the field in which products, such as plastic shaped articles, in which the propylene-diene copolymer resin according to the present invention is used, are employed. However, preferably the products may be used mainly for automobile interior and exterior materials, and specifically for automobile interior foam film/sheet, shock-absorbing materials, thermoforming products, trays, sound insulating materials, insulation materials, large hollows, and automobile parts.

Hereinafter, the present invention will be described by specific examples.

Except where otherwise noted, all ligand and catalyst synthesis experiments were performed using standard Schlenk or glovebox techniques under nitrogen atmosphere, and organic solvents used in all reactions were refluxed under sodium metal and benzophenone to remove moisture and then, were distilled immediately before use. $^1$H-NMR analyses of synthesized ligands and catalysts were performed using Bruker 300 MHz at room temperature.

The polymerization solvent, n-hexane, was passed through a tube filled with 5A molecular sieve and activated alumina and bubbled with high purity nitrogen to remove sufficiently moisture, oxygen and other catalytic poison substances and then used. All the polymerization was carried out by injecting required amounts of solvents, cocatalyst compounds, monomers to be polymerized, etc. in a high-pressure reactor (autoclave) completely blocked from the outside air, and then introducing the metallocene compound. 10 wt % methylaluminoxane (MAO) solution in toluene (Albemarle) was purchased to use as MAO. The polymerized polymer resin was analyzed according to the following method.

(1) Melt Flow Index (MI)

Measurement was performed according to ASTM D 2839 at a load of 2.16 kg at 230° C.

(2) Melting Point (Tm) Analysis

Measurement was performed under the 2nd heating condition at the rate of 10° C./min under nitrogen atmosphere using Dupont DSC2910.

(3) Weight Average Molecular Weight (Mw) and Molecular Weight Distribution (Mw/Mn)

Measurement was performed in the presence of 1,2,3-trichlorobenzene solvent at the rate of 1.0 mL/min at 135° C. using PL210 GPC equipped with PL Mixed-BX2+preCol, and the molecular weight was corrected using a PL polystyrene standard material.

(4) Melt Tension (Advanced Rheometric Expansion System (ARES))

A specimen, with the width of 20 mm, the length of 10 mm and the thickness of 7 mm, prepared through hot press melting or injection was fixed to a sample holder using a rheometric measurement instrument (2KFRTN, TA Instrument), and then, the melt tension was measured as the resistance value of the specimen when the sample holder was rotated about an axis.

(5) Gel Content

The gel content of the polymer resin was measured in the following order.

1) Prepare a sample into a 20 μm film, cut it into 2 cm×2 cm in size, and weigh it.
2) Add 500 mL of xylene into a 1 L container (rbf Reflux).
3) Prepare a stainless steel mesh of 200 mesh into 3 cm×3 cm in size and weigh it.
4) Put the sample prepared in 1) into the prepared mesh and seal it.
5) Add the sample prepared in 4) to the container prepared in 2) and perform xylene refluxing for 12 hours.
6) After removal of the reflux device, take out the sample and remove the xylene soluble part attached to the surface of the mesh using a tube with nitrogen.
7) Place the mesh into a vacuum oven at 140° C. and dry it for 8 hours.
8) Weigh the dried mesh.
9) Measure the xylene insoluble material by comparing the sum of the mesh weight in 3) plus the sample weight in 1) with the weight in 8).

Synthesis of the Metalocene Compound tetramethylcyclopentadienyl dimethylsilyl 2-methyl-4-(4-tert-butylphenyl) indenyl Zr dichloride 1) Synthesis of dimethyl tetramethylcyclopentadienyl chlorosilane To a 2 L flask, tetrahydrofuran (600 mL) and tetramethylcyclopentadiene (50 g) were added and n-BuLi (2.5 M in hexane solution) (170 mL) was slowly added dropwise thereto at −10° C. under nitrogen atmosphere, and the reaction was carried out by stirring at room temperature for 12 hours. The temperature of the reaction solution was lowered to −10° C. again, and dimethyldichlorosilane (170 g) was added, and the reaction was carried out by stirring at room temperature for 12 hours, and then, the reaction product was vacuum dried. To the reaction product, n-hexane (500 mL) was added to dissolve the reaction product. The reaction mixture was filtered through a Celite filter, and the filtrate was vacuum dried to obtain 70 g of dimethyl tetramethylcyclopentadienyl chlorosilane in the form of yellow oil (yield: 80%).

$^1$H-NMR (300 MHz, CDCl3) δ 0.235 (s, 6H), 1.81 (s, 6H), 1.97 (s, 6H), 3.07 (s, 1H)

2) Synthesis of dimethyl tetramethylcyclopentadienyl 2-methyl-4-(4-tert-butylphenyl)indenyl silane A flask charged with toluene (200 mL), tetrahydrofuran (40 mL) and 2-methyl-4-(4-t-butylphenyl) indene (50 g) was cooled to −10° C. and n-BuLi (2.5 M in hexane solution) (76 mL) was slowly added dropwise thereto, followed by stirring at room temperature for 12 hours. The temperature of the reaction mixture was lowered to −10° C. again, and then dimethyl tetramethylcyclopentadienyl chlorosilane (38 g) was added thereto, and the reaction was carried out by stirring at room temperature for 12 hours. After completion of the reaction, water (400 mL) was added thereto, and the mixture was stirred at room temperature for 1.5 hours. Then, the mixture was extracted with toluene and vacuum dried to obtain 80 g of dimethyl tetramethylcyclopentadienyl 2-methyl-4-(4-t-butylphenyl) indenyl silane (yield: 95%).

$^1$H-NMR (300 MHz, CDCl3) δ 0.2-0.23 (d, 6H), 1.44 (s, 9H), 1.91 (s, 6H), 2.05-2.08 (d, 6H), 2.29 (s, 3H), 2.41 (s, 1H), 3.76 (s, 1H), 6.87 (s, 1H)

3) Synthesis of tetramethylcyclopentadienyl dimethylsilyl 2-methyl-4-(4-tert-butylphenyl)indenyl Zr dichloride Dimethyl tetramethylcyclopentadienyl 2-methyl-4-(4-t-butylphenyl) indenyl silane (50 g), toluene (300 mL) and diethyl ether (100 mL) were added to a flask, and the mixture was cooled to −10° C., and then n-BuLi (2.5 M in hexane solution) (90 mL) was slowly added dropwise thereto. After the end of dropwise addition, the reaction temperature was raised to room temperature, and the mixture was stirred for 48 hours, and then filtered. The obtained filtrate was vacuum dried to obtain 40 g (yield 80%) of tetramethylcyclopentadienyl dimethylsilyl 2-methyl-4-(4-t-butylphenyl) indenyl dilithium salt in the form of a solid, which was used directly in the next reaction without purification.

Tetramethylcyclopentadienyldimethylsilyl 2-methyl-4-(4-t-butylphenyl) indenyl dilithium salt (40 g), toluene (40 mL) and ether (10 mL) were placed into flask #1 and the mixture was stirred. In Flask #2, the mixture of toluene (30 mL) and ZrCl4 (20 g) was prepared. The mixture in flask #2 was slowly added dropwise into flask #1 with a cannula, and the mixture was stirred at room temperature for 24 hours. After stirring, the mixture was vacuum dried, extracted with methylene chloride (500 mL), filtered through a Celite filter, and then the filtrate was vacuum dried. The resulting solid was washed with the 1:3 mixture (50 mL) of methylene chloride and n-hexane and then vacuum dried to obtain 32 g of tetramethylcyclopentadienyl dimethylsilyl 2-methyl-4-(4-t-butylphenyl) indenyl zirconium dichloride in the form of yellow solid (yield: 60%).

$^1$H-NMR (300 MHz, CDCl3) δ 1.09 (s, 3H), 1.202 (s, 3H), 1.346 (s, 9H), 1.887-1.911 (d, 6H), 1.989 (s, 3H), 2.075 (s, 3H), 2.278 (s, 3H), 7.0-7.628 (m, 8H)

Example 1

The inside of a stainless steel autoclave having an inner volume of 3 liter at room temperature was completely replaced with nitrogen. 600 mL of n-hexane and 4.0 mL of methylaluminoxane toluene solution (6 mmol on the basis of Al) were added at room temperature while nitrogen purging was maintained. Then, 500 g of propylene was added and the temperature was raised to 70° C. Then, the metallocene compound and 1 mL of 1,5-hexadiene, as the diene compound, were added using a catalytic tank. Thereafter, polymerization was carried out for 30 minutes. After completion of polymerization, the mixture was kept at room temperature, and then excess propylene was removed through a discharge line to obtain a polymer. The obtained polymer was dried for 4 hours or more while heating at 80° C. using a vacuum oven to prepare a propylene-diene copolymer resin.

Example 2

A propylene-diene copolymer resin was prepared in the same manner as in Example 1, except that 5 mL of 1,5-hexadiene was used in Example 1.

Example 3

A propylene-diene copolymer resin was prepared in the same manner as in Example 1, except that 1,7-octadiene was used instead of 1,5-hexadiene in Example 1.

Example 4

A propylene-diene copolymer resin was prepared in the same manner as in Example 2, except that 1,7-octadiene was used instead of 1,5-hexadiene in Example 2.

Comparative Example 1

A propylene polymer resin was prepared in the same manner as in Example 1, except that 1,5-hexadiene was not used in Example 1.

Comparative Example 2

A propylene-diene copolymer resin was prepared in the same manner as in Example 1, except that 0.5 mL of 1,5-hexadiene was used in Example 1.

Comparative Example 3

A propylene-diene copolymer resin was prepared in the same manner as in Example 1, except that 10 mL of 1,5-hexadiene was used in Example 1.

Comparative Example 4

A propylene-diene copolymer resin was prepared in the same manner as in Example 3, except that 0.5 mL of 1,7-hexadiene was used in Example 3.

Comparative Example 5

A propylene-diene copolymer resin was prepared in the same manner as in Example 3, except that 10 mL of 1,7-hexadiene was used in Example 3.

Comparative Example 6

A propylene-diene copolymer resin was prepared in the same manner as in Example 2, except that commercial Ziegler-Natta catalyst system (LC200, Lotte Chemical Corporation) was used as the catalyst system in Example 2.

Comparative Example 7

A propylene-diene copolymer resin was prepared in the same manner as in Example 4, except that commercial Ziegler-Natta catalyst system was used as the catalyst system in Example 4.

Comparative Example 8

High-melt-tension polypropylene resin (HMSPP, SMS-514F, Lotte Chemical Corporation), which was produced by peroxide decomposition using a post-process according to the conventional method, was prepared.

First, the results of measuring the catalytic activity, melting point (Tm), weight average molecular weight and molecular weight distribution of the polymer resins prepared according to Examples 1 to 4 and Comparative Examples 1, 2, 4, 6 and 7 are shown in Table 1 below.

TABLE 1

| category | Propylene (g) | Hexadiene (ml) | Octadiene (ml) | Activity (kg/g-cat) | Tm (° C.) | Mw | MWD |
|---|---|---|---|---|---|---|---|
| Example 1 | 500 | 1 | — | 622 | 149/135 | 120,540 | 4.03 |
| Example 2 | 500 | 5 | — | 580 | 145/134 | 380,380 | 6.03 |
| Example 3 | 500 | — | 1 | 630 | 149/135 | 190,540 | 4.82 |
| Example 4 | 500 | — | 5 | 552 | 142/134 | 423,112 | 6.03 |
| comp. ex. 1 | 500 | — | — | 690 | 153 | 86,591 | 3.06 |
| comp. ex. 2 | 500 | 0.5 | — | 650 | 152 | 86,380 | 3.03 |
| comp. ex. 4 | 500 | — | 0.5 | 685 | 153 | 82,591 | 3.06 |
| comp. ex. 6 | 500 | 5 | — | 26 | 161 | 320,102 | 4.8 |
| comp. ex. 7 | 500 | — | 5 | 24 | 161 | 310,102 | 4.5 |

Referring to Table 1, it can be confirmed that according to the present invention, the diene-modified propylene-diene copolymer resin is prepared in the polymerization process by using the specific metallocene catalyst system and the specific content of the diene compound is used, so that the propylene-diene copolymer resin has the excellent catalytic activity during the polymerization, has two melting peaks in the ranges of specific peak temperatures, has the required weight average molecular weight and molecular weight distribution, and thus, it exhibits different properties from copolymer resins produced by conventional methods so as to have improved processability and has properties suitable for improvement of melt strength.

Next, the polymer resins prepared according to Examples 1 to 4 and Comparative Examples 1, 3, and 5 to 8 were extruded by a twin extruder at the temperature range of 190 to 250° C., followed by cooling and solidifying to obtain pellets. Pellets were used as a specimen to measure the melt index, melt tension (ARES) and gel content. The results thereof are shown in Table 2 below.

TABLE 2

| Category | MI (g/10 min) | ARES (g) | Gel content (wt %) |
|---|---|---|---|
| Example 1 | 2.5 | 22 | 2.3 |
| Example 2 | 2.0 | 30 | 3.5 |
| Example 3 | 0.7 | 35 | 4.1 |
| Example 4 | 0.5 | 38 | 4.6 |
| Comp. ex. 1 | 56 | 3 | 0 |
| Comp. ex. 3 | 0.1 | 37 | 10.2 |
| Comp. ex. 5 | 0.1 | 62 | 13.3 |
| Comp. ex. 6 | 1.5 | 3 | 0.2 |
| Comp. ex. 7 | 1.5 | 3 | 0.2 |
| Comp. ex. 8 | 1.9 | 8 | 2.4 |

Referring to Table 2, it can be confirmed that according to the present invention, the modified propylene-diene copolymer resin prepared by using the specific metallocene catalyst system and the specific content of the diene compound has the melt index at the level of 0.5 to 2.5 g/10 min and increases the melt tension to the level of 22 to 38 g, while maintaining the gel content at 5% or less, and has excellent properties with low process cost to long chain branched resins produced by conventional post-processes.

The preferred embodiments of the present invention have been described in detail above. The description of the present invention is for illustration. It will be understood by those skilled in the art that modification of other detailed forms may be easily made without altering the technical ideas or essential features of the present invention.

Accordingly, the scope of the present invention is expressed by the claims described hereafter rather than by the above-mentioned detailed description and all the altered or modified forms deduced from the meanings, ranges of the claims, and the equivalent concepts thereof should be construed as falling within the scope of the present invention.

The invention claimed is:

1. A propylene-diene copolymer resin produced by a method comprising the step of polymerizing propylene and a diene compound of C4-C20 by using a catalyst system, wherein the catalyst system comprises: a metallocene compound represented by the following Chemical Formula 1; and at least one cocatalyst compound selected from the group consisting of a boron compound represented by the following Chemical Formulae 2 to 4 and an aluminum compound represented by the following Chemical Formulae 5 to 9, and the propylene-diene copolymer resin has the melt index (2.16 kg load at 230° C.) of 0.1-100 g/10 min and the melt tension (advanced rheometric expansion system (ARES)) of 5-100 g:

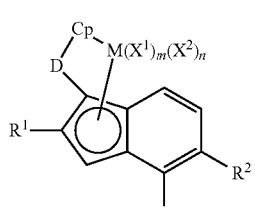

[Chemical Formula 1]

[Chemical Formula 2]

[Chemical Formula 3]

[Chemical Formula 4]

[Chemical Formula 5]

[Chemical Formula 6]

[Chemical Formula 7]

[Chemical Formula 8]

[Chemical Formula 9]

in Chemical Formula 1, M is a tetravalent or divalent group 4 transition metal of the periodic table, and m is 2 and n is 0 when M is a tetravalent transition metal of group 4 of the periodic table, and m is 0 and n is 1 when M is a divalent transition metal of group 4 of the periodic table; Cp is a cyclopentadienyl ring which may be $\eta^5$-bonded to M and the cyclopentadienyl ring may be further substituted by at least one selected from the group consisting of (C1-C20) alkyl, (C3-C20) cycloalkyl, (C6-C20) aryl, tri(C1-C20) alkylsilyl, tri(C6-C20) arylsilyl, (C1-C20) alkyldi (C6-C20) arylsilyl, (C6-C20) aryldi (C1-C20) alkylsilyl and (C2-C20) alkenyl; D is $SiR^3R^4$ or (C2-C20) alkenylene; $R^3$ and $R^4$ are each independently hydrogen, (C1-C20) alkyl, (C3-C20) cycloalkyl or (C6-C20) aryl, or $R^3$ and $R^4$ may be linked by (C4-C7) alkylene to form a ring; $R^1$ is (C1-C20) alkyl; Ar is (C6-C20) aryl; $R^2$ is hydrogen, (C1-C20) alkyl, (C3-C20) cycloalkyl or (C6-C20) aryl; the Ar and $R^2$ may be linked by (C1-C7) alkylene, (C2-C7) alkenylene or (C4-C7) alkane dienylene to form a fused ring; $X^1$ is halogen, (C1-C20) alkyl, (C1-C20) alkoxy, (C3-C20) cycloalkyl, (C6-C20) aryl, (C6-C20) aryloxy, —$OSiR^aR^bR^c$, —$SR^d$, —$NR^eR^f$, or —$PR^gR^h$; $R^a$ to $R^h$ are each independently (C1-C20) alkyl, (C6-C20) aryl or (C3-C20) cycloalkyl; $X^2$ is a neutral, conjugated or nonconjugated (C4-C20) diene; the alkyl in $R^1$, the aryl in Ar, the alkyl, cycloalkyl, and aryl in $R^2$, $R^3$, and $R^4$ may be each independently further substitute by at least one substituent selected from the group consisting of halogen, (C1-C20) alkyl, halo (C1-C20) alkyl, (C3-C20) cycloalkyl, (C6-C20) aryl, (C1-C20) alkoxy and (C6-C20) aryloxy;

in Chemical Formulae 2 to 4, B is a boron atom; $R^{11}$ is phenyl, and the phenyl may be further substituted by three to five substituents selected from a fluorine atom, (C1-C20) alkyl, (C1-C20) alkyl substituted by a fluorine atom, (C1-C20) alkoxy, and (C1-C20) alkoxy substituted by a fluorine atom; $R^{12}$ is a (C5-C7) aromatic radical or a (C1-C20) alkyl (C6-C20) aryl radical or a (C6-C20) aryl (C1-C20) alkyl radical; Z is a nitrogen or phosphorus atom; $R^{13}$ is a (C1-C20) alkyl radical or an anilinium radical substituted by two (C1-C10) alkyls together with a nitrogen atom; r is an integer of 2 or 3;

in Chemical Formulae 5 to 9, $R^{14}$ is (C1-C20) alkyl; s and t are each independently an integer of 5 to 20; $R^{15}$ and $R^{16}$ are each independently (C1-C20) alkyl; E is a hydrogen atom, a halogen atom or (C1-C20) alkyl; u is an integer of 1 to 3; $R^{17}$ is (C1-C20) alkyl or (C6-C20) aryl, and the propylene-diene copolymer resin comprises two melting peaks at 140 to 154° C. and 129 to 135° C. respectively.

2. The propylene-diene copolymer resin of claim 1, wherein in the step of polymerizing, the content of the diene compound is prepared in 0.001 to 3 mol % based on the propylene.

3. The propylene-diene copolymer resin of claim 1, wherein the diene compound is at least one selected from the group consisting of linear or branched C4-C20 diene or C5-C20 cyclodiene.

4. The propylene-diene copolymer resin of claim 3, wherein the diene compound is at least one selected from the group consisting of 1,3-butadiene, 1,4-pentadiene, 2-methyl-1,3-butadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimentyl-1,5-hexadiene, cyclopentadiene, cyclohexadiene, cycloheptadiene, and cyclooctadiene.

5. The propylene-diene copolymer resin of claim 1, wherein the propylene-diene copolymer resin has the gel content of 10% by weight or less.

* * * * *